(12) United States Patent
Kramer et al.

(10) Patent No.: US 6,314,342 B1
(45) Date of Patent: Nov. 6, 2001

(54) METHOD AND SYSTEM FOR OPTIMIZING OPERATION OF VEHICLE CONTROL SYSTEMS BASED ON THE DYNAMICS OF THE VEHICLE

(75) Inventors: Dennis A. Kramer, Troy; Dale Bell, Ortonville; Ronald N. Brissette, Lake Orion; Christopher S. Keeney, Troy, all of MI (US); Jack R. McKenzie, Hendersonville, NC (US); Brian J. Mueller, Lake Orion, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/619,453

(22) Filed: Jul. 19, 2000

(51) Int. Cl.[7] .............................. B60K 1/00; B61C 15/08
(52) U.S. Cl. .............................. 701/1; 701/106; 701/109; 701/115; 180/197; 388/814; 74/866; 318/432
(58) Field of Search .............................. 701/1; 477/110; 318/630, 611, 430; 303/191; 74/866

(56) References Cited

U.S. PATENT DOCUMENTS

| | | | |
|---|---|---|---|
| 4,724,723 | * | 2/1988 | Lockhart et al. ....................... 74/854 |
| 5,123,302 | * | 6/1992 | Brown et al. ....................... 74/866 |
| 5,394,327 | | 2/1995 | Simon, Jr. et al. ....................... 70/1 |
| 5,556,174 | * | 9/1996 | Wiss et al. ....................... 303/191 |
| 5,761,626 | | 6/1998 | Tascillo et al. ....................... 701/29 |
| 5,841,254 | * | 11/1998 | Balch et al. ....................... 318/430 |
| 5,994,859 | * | 11/1999 | Deng et al. ....................... 318/432 |
| 6,072,297 | * | 6/2000 | Xu et al. ....................... 318/630 |
| 6,077,191 | * | 6/2000 | Minowa et al. ....................... 477/109 |
| 6,161,844 | * | 12/2000 | Charaudeau et al. ....................... 280/5.515 |

* cited by examiner

Primary Examiner—William A. Cuchlinski, Jr.
Assistant Examiner—Tuan C To
(74) Attorney, Agent, or Firm—Carlson, Gaskey & Olds

(57) ABSTRACT

A method and system for optimizing performance of vehicle control systems based on the dynamics of the specific vehicle include a sensor for sensing a predetermined parameter associated with any one of the vehicle control systems during a predetermined trigger event. A control logic determines a critical vibration mode characteristic for the vehicle control system based on the sensed parameter and operates the vehicle control system based on the determined critical vibration mode characteristic.

27 Claims, 4 Drawing Sheets

METHOD AND SYSTEM FOR OPTIMIZING OPERATION OF VEHICLE CONTROL SYSTEMS BASED ON THE DYNAMICS OF THE VEHICLE

BACKGROUND OF THE INVENTION

This invention relates to methods and systems for optimizing operation of vehicle control systems based on the critical dynamics of the particular vehicle, Automotive vehicles are built by the manufacturer according to the manufacturer's specification. That is, the manufacturer controls the specifications of each manufactured vehicle thereby having knowledge of each vehicle's critical dynamics. Thus, the manufacturer can design the various vehicle control systems accordingly to optimize their performance. Examples of vehicle control systems include automatic gearshift systems, vibration control systems, antilock brake systems, traction control systems, and vehicle stability systems.

Heavy vehicles, such as trucks, on the other hand, are typically custom-built according o the buyer's specification. Several options exist for many of the components including, but not limited to, the engine, clutch, transmission, driveline, drive axles, brakes, and suspension systems. The specification of any resultant commercial truck, therefore, is not known in advance of the manufacture of the vehicle. Consequently, the effectiveness of each of the various vehicle control systems is often compromised in commercial vehicles due to the poor or insufficient estimation of the critical dynamic and vibratory characteristics of the system being controlled. These characteristics, such as natural frequencies and damping ratios, define the system's transient and steady state response characteristics, which in turn define optimum values for active or passive control parameters such as gains, decay rates, and filter parameters.

Often, the lack of specific knowledge can result in less than optimum control of a vehicle in operation. As an example, a torque control typically is limited to avoid operation at the natural powertrain torsional frequency. Given the potential range across possible vehicles, designers often compromise operation to ensure that the torque control will not result in the vehicle operating at its natural frequency. That is, a margin of error must be factored into the control to accommodate all possible vehicle combinations and the resultant range in natural frequencies.

Thus, there exists a need to optimize effectiveness of vehicle control systems for the wide range of powertrain and suspension dynamic and vibratory characteristics of highly configurable vehicles.

SUMMARY OF THE INVENTION

It is an object of the present invention to provide a method and system for optimizing the effectiveness of a vehicle's various control systems based on the critical dynamics of the particular vehicle. Essentially, by determining the actual characteristics of the vehicle, control systems can be optimized to eliminate any "margin of error" issues.

In carrying out the above object and other objects, features and advantages of the present invention, a method is provided for optimizing performance of any one of a plurality of vehicle control systems based on the dynamics of the specific vehicle. The method includes sensing a predetermined parameter associated with one of the vehicle control systems during a predetermined trigger event, determining a critical vibration mode characteristic for the one control system based on the sensed parameter, and operating the one vehicle control system based on the determined critical vibration mode characteristic.

In further carrying out the above object and other objects, features and advantages of the present invention, a system is also provided for carrying out the steps of the above described method. The system includes a sensor for sensing a predetermined parameter associated with one of the vehicle control systems. The system also includes a control logic for determining a critical vibration mode characteristic for the one control system based on the sensed parameter and operating the one vehicle control system based on the determined critical vibration mode characteristic.

While several examples are included, it should be understood that many other systems may benefit from this invention.

These and other features of the present invention can be understood from the following specification and drawings.

DETAILED DESCRIPTION OF A PREFERRED EMBODIMENT

Figure 1:
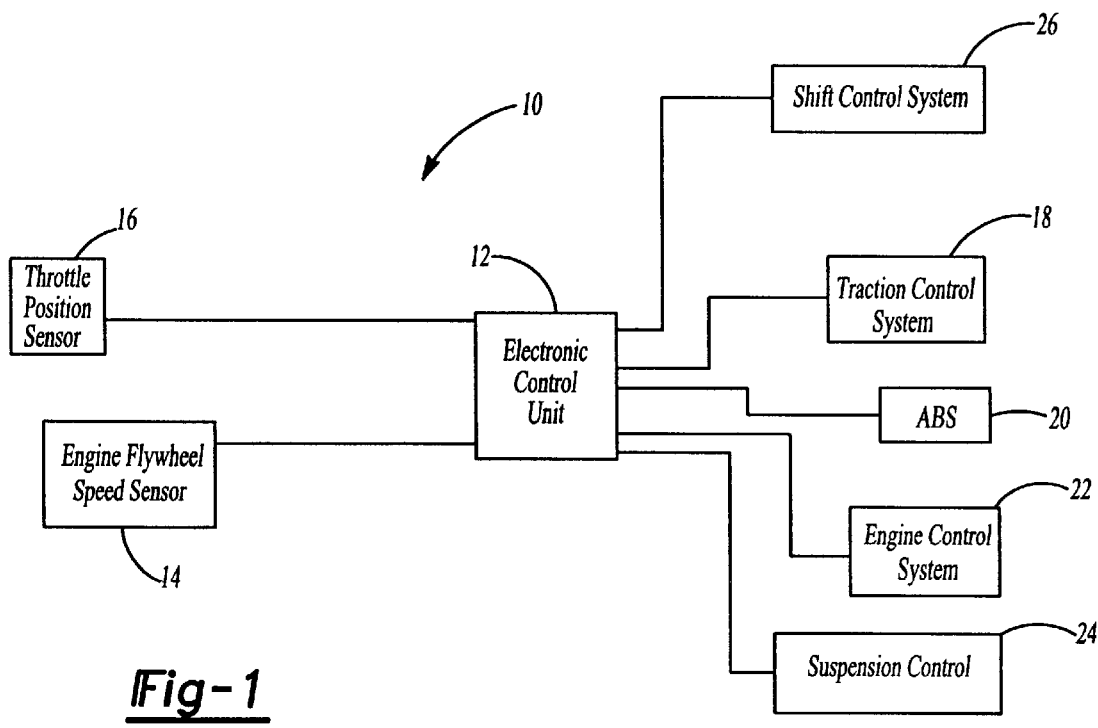
FIG. 1 is a schematic block diagram of a system according to the present invention.

The present invention provides a method and system for automatically determining the critical dynamic and vibratory characteristics inherent to a particular vehicle's system and adapting the control systems accordingly. The system, denoted generally by reference numeral 10 in FIG. 1, generally includes an electronic control unit ("ECU") 12 for receiving input signals from various force and motion sensors including, but not limited to, an engine flywheel torque sensor 14 and a throttle position sensor 16, to name a few. The ECU 12 then processes these signals utilizing a programmed algorithm or control logic to calculate corresponding critical dynamic characteristics. Upon learning these critical dynamic characteristics, ECU 12 then correspondingly adapts the various vehicle control systems including, but not limited to, a traction control system 18, an ABS 20, an engine control system 22, a suspension control system 24, and a shift control system 26.

Outputs of the sensors 14,16 are monitored during specific "trigger" events in which the dynamics or vibrations of interest are likely to be excited. These are processed to identify input and output relationships of such parameters as amplitude, frequency, phasing, and decay rate. ECU 12 then calculates critical dynamic characteristics, such as natural frequency, damping ratio, response time constant, and hysteresis. As critical dynamic characteristics are "learned" or updated, appropriate control parameters are adjusted to provide effective and optimized system performance. The calculated estimates of critical dynamic characteristics may be improved over time through averaging and updating. The dynamic characteristics and/or updated control parameters are stored in ECU 12. The learning process may take place automatically during normal operation, or during prescribed "learning event" schedules.

Figure 2:
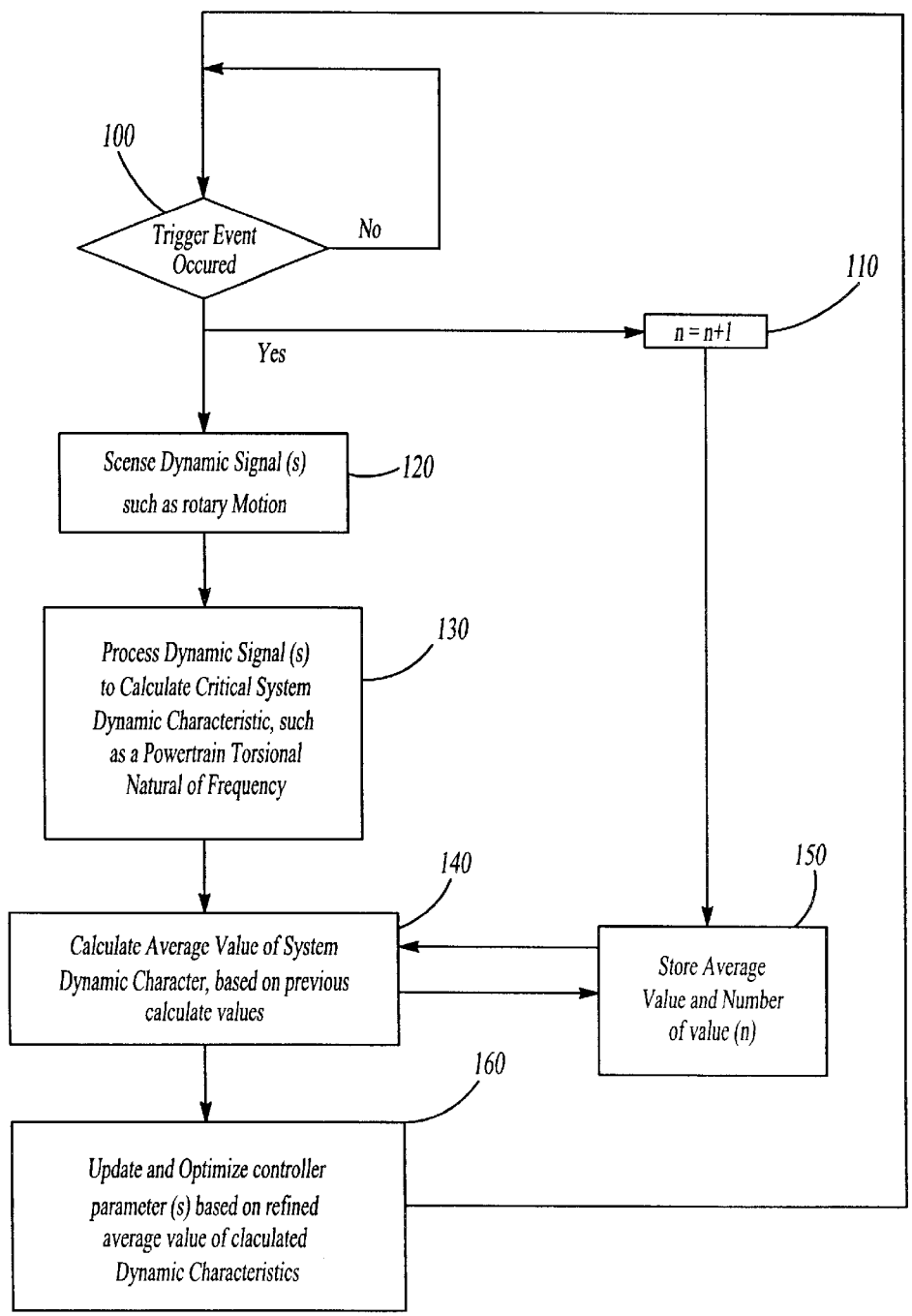
FIG. 2 is a flow diagram illustrating the operation of the method of the present invention.

Turning now to FIG. 2, there is shown a flow diagram illustrating the general sequence of steps associated with the method of the present invention. Vehicle control systems can be affected by both powertrain and suspension vibration modes. Therefore, the present invention begins with the step of determining whether the vehicle control system being optimized is affected by powertrain or suspension vibration. Powertrain torsional vibration mode information, such as natural frequencies and damping ratios, are learned and are used to automatically optimize control parameters, including those associated with the following items: engine fuel or torque modulation, clutch modulation, clutch damping, transmission shifting, automated mechanical transmission shifting, transmission clutch and/or synchronizer modulation, differential lock clutch or synchronizer modulation, brake modulation and tire pressure.

Powertrain torsional vibration modes often cause undesirable torsional dynamics, resulting in poor control system performance and in noise and vibration issues. For example, in typical commercial vehicles, the 1st (fundamental, low frequency) powertrain torsional mode results in excessive transient torque, motion overshoot and oscillation in the drivetrain, excited by such things as rapid changes in engine torque and clutch disengagement/engagement. This causes problems with shifting, and traction and braking control systems. The 2nd and 3rd (mid frequency) powertrain torsional vibration modes can be excited by engine firing pulses or driveline universal joint kinematics during operation, causing resonant torsional powertrain vibration. This can result in noise issues and drivetrain damage. Mid-high frequency torsional modes can be excited by the stick/slip instability of friction clutches and brakes, resulting in severe noise and vibration issues. Terms typically used to describe these issues include "shudder", "judder", and "chatter".

If the vehicle control system is affected by powertrain vibration, the method proceeds to determine if the control system requires optimization at low frequency. If so, low frequency, or fundamental, powertrain torsional vibration modes are identified by observing and processing the torsional motion or torque at a predetermined powertrain location during a trigger event, as shown at conditional block 100. Appropriate trigger events include "step" throttle on or off events or clutch application events, which are known to cause significant transient excitation of the fundamental powertrain torsional modes, or instances where a prescribed low frequency vibration amplitude threshold is exceeded.

Upon sensing the predetermined trigger event, the method proceeds to sense torsional motion at a predetermined location in the powertrain, as shown at block 120. Appropriate sensing methods include all known methods for sensing rotational motion and torque. Known methods for rotational motion sensing include magnetic and inductive pickups, Hall effect sensors, toothed wheels or gears (including existing gears), optical encoders, tangentially mounted accelerometers, and laser vibrometers. Known methods for torque sensing include strain gages, relative torsional "angle of twist" sensing, and laser optics, etc. Still further, existing sensors such as the tachometer speed sensor for the engine, the road speed sensor typically located in the transmission, and the ABS wheel speed sensors may be used. Each triggering event is counted, as shown at block 110, for determining the average.

The critical characteristic is determined, as shown at block 130, from the sensed rotational motion. Appropriate signal processing methods include all known methods for frequency analysis and for rotational motion processing from pulse data, including filtering, fast fourier transform (FFT) processing, order tracking, peak picking, zero crossing, and frequency demodulation and frequency counting (for rotational motion processing). The average is calculated at block 140 and stored at block 150. Finally, the controller parameters are updated based upon the newly calculated dynamic characteristic. Given this disclosure, a worker in this art would know how to determine many of the possible characteristics given the mentioned sensed signal.

Figure 3:
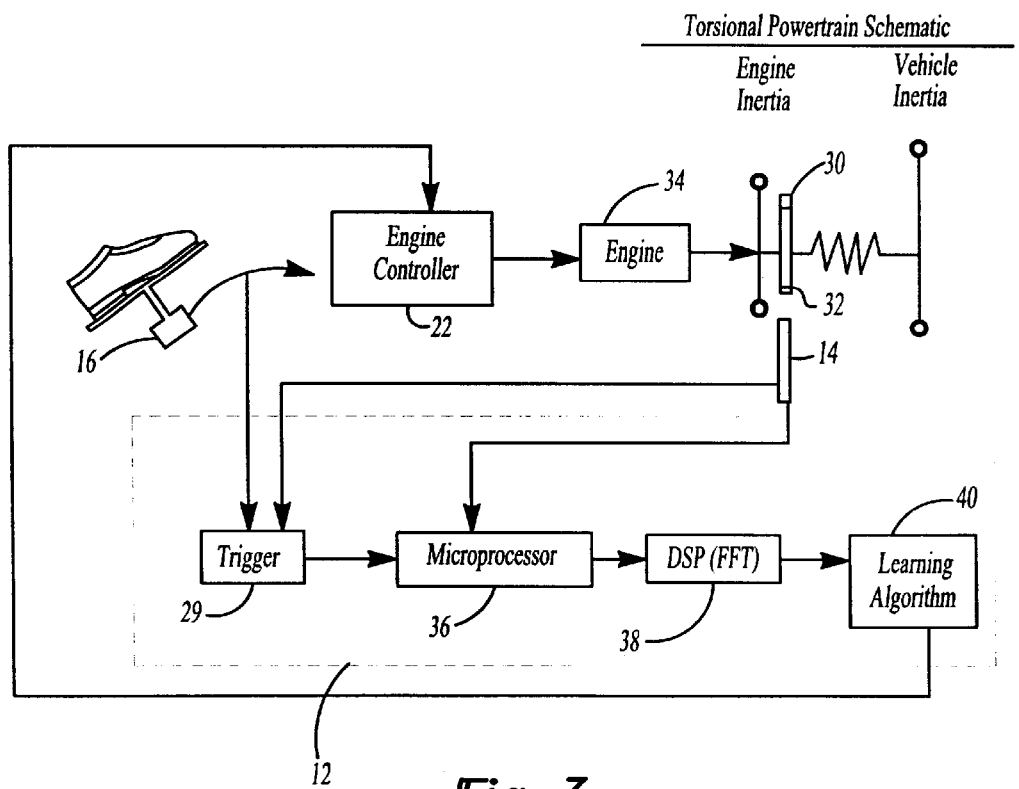
FIG. 3 is a schematic diagram of the electronic control unit of the system of the present invention.
Figure 4A:
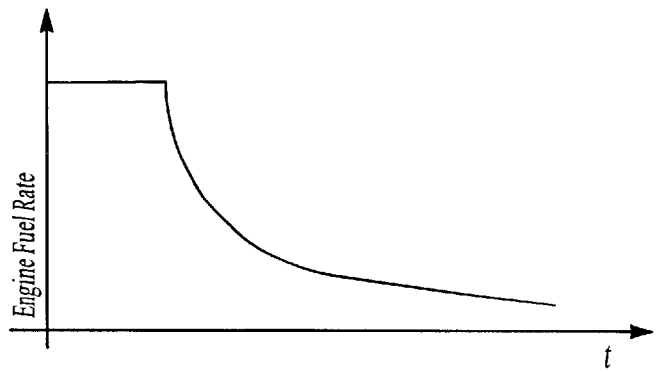
FIGS. 4A–4C are graphs illustrating various typical responses of an engine.
Figure 4B:
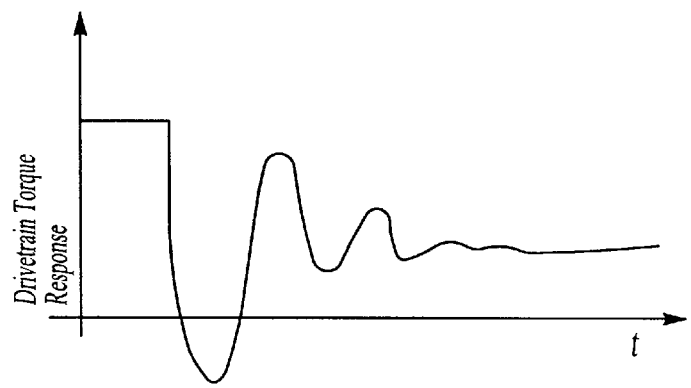

Operation of the present invention with respect to low frequency vibration mode will further be described in conjunction with FIG. 3. Upon sensing a step on or off the throttle pedal 16, an event trigger module 29 is initiated while the torsional motion is sensed at the engine flywheel 30 with a magnetic sensor 14 mounted over the starter gear teeth 32 on the outer diameter of the flywheel 30. The transmission torsional motion may alternatively be sensed with a magnetic sensor mounted over a transmission gear, or with the existing speedometer sensor. During this learning phase, the fuel rate dictated by the engine controller 22 into the engine 34 and the torque response in the drivetrain 34 have characteristics as shown in FIGS. 4a and 4b, respectively.

Figure 4C:
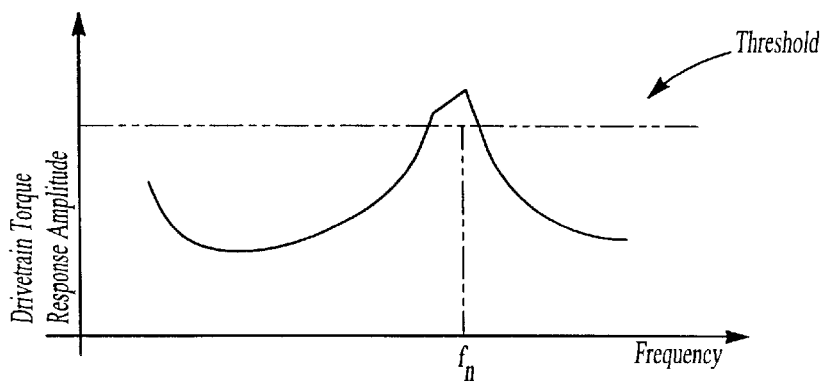
Figure 5A:
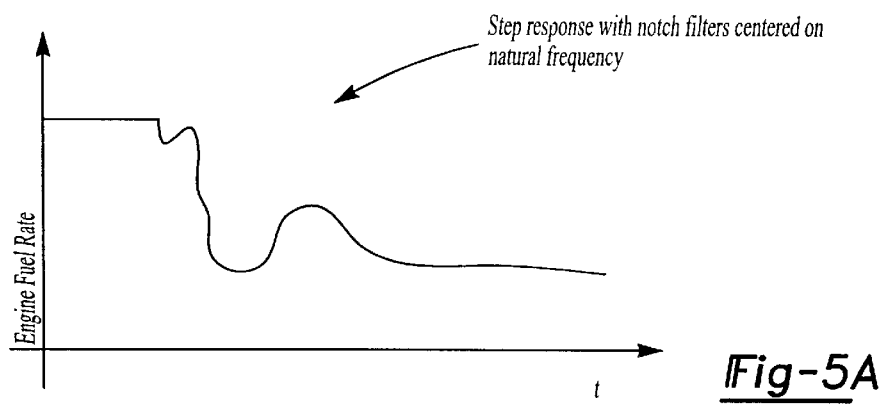
FIGS. 5A–5C are graphs of the various responses shown in FIGS. 4A–4C after application of the present invention.
Figure 5B:
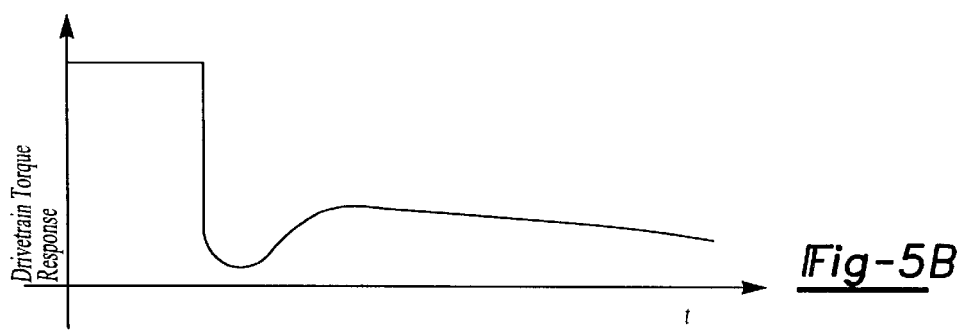
Figure 5C:
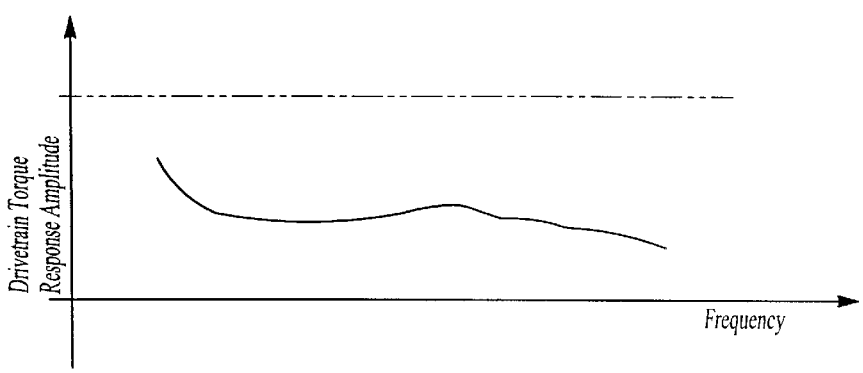

The torsional motion is processed via microprocessor 36 and filtered via DSP (Digital Signal Processor) filter 38. A learning algorithm 40 determines the natural frequencies of the modes as the dominant "AC" low frequency components of torsional activity, as shown in FIG. 4c. As a result of learning powertrain natural frequency, a filter is applied to the fuel rate by engine controller 22 centered on the previously learned natural frequency, as shown in FIG. 5a. Consequently, the transient torque fluctuation exhibited in the drivetrain is minimized, as shown in FIG. 5b and FIG. 5c. Through all of this control the fact that the actual characteristic is known allows close tailoring of the control to the particular vehicle.

In another example, drivetrain torsional stiffness may be determined automatically through "learned" torsional natural frequencies, and foreknowledge of associated component inertia and stiffness values. That is, the overall drivetrain equivalent torsional stiffness, $J_{eq}$, may be determined from the "learned" 1st powertrain natural frequency ($\omega 1$), the foreknown equivalent vehicle inertia, and the foreknown engine inertia according to:

$$\omega 1 = \text{sqrt}(K_{dtrain}/J_{eq}), \text{ and}$$

$$J_{eq} = J_{eng} * J_{veq}/(J_{eq} + J_{veq}),$$

where $J_{eng}$ is the engine, or the combined engine and transmission inertia, $J_{veq}$ is the equivalent vehicle inertia, determined from the gross combined weight of the vehicle, the tire rolling radius, and the inertia of the tires, and $K_{dtrain}$ is the equivalent overall torsional stiffness of the drivetrain.

Tire pressure is adjusted as a function of the learned drivetrain torsional stiffness or natural frequency, to judiciously affect the drivetrain torsional stiffness or torsional natural frequency. Tire pressure has a significant effect on the torsional stiffness and low frequency torsional modes of the powertrain, which can impact such things as the performance of differential locking systems for traction control systems.

Returning now to FIG. 2, if the vehicle control system requires optimization at mid-high frequencies the method proceeds to sense an appropriate trigger event, as discussed above. An appropriate trigger condition includes a stabilized full fuel (maximum torque) engine condition, which is known to sometimes cause significant resonant excitation of mid range powertrain torsional modes due to engine firing pulses, or a condition in which a vibration magnitude or phase threshold is crossed. The relative amplitude or phase of torsional motion between two locations is sensed and tracked at a reference frequency, such as the engine firing frequency or driveline rotating frequency. Natural frequencies of torsional modes are determined as frequencies in which the relative torsional vibration amplitude is at a maximum, or in which a change in the relative torsional vibration phase indicates a resonance. Ideal locations for the two measurements are just before and just after the clutch, as the clutch damper is typically a nodal location for the critical powertrain torsional vibration modes of interest.

Alternatively, the mid to high frequency powertrain torsional vibration modes may be determined by observing and processing absolute torsional motion or torque at a location in the drivetrain, during a "trigger" condition. An appropriate trigger condition is the same as above. The absolute amplitude or phase of torsional motion or torque at a predetermined powertrain location is tracked at a reference excitation frequency such as frequencies related to the engine firing frequency or driveline speed. Natural frequencies of torsional modes are then determined as frequencies in which the absolute torsional vibration amplitude is at a maximum. Alternatively, torsional natural frequencies are determined as frequencies where a change in the torsional vibration phase relative to an excitation source, such as engine firing, indicates a resonance.

In yet another embodiment, mid to high frequency powertrain torsional vibration modes are determined by monitoring non-torsional, but related, signals during the "trigger" conditions. Torsional powertrain modes are often manifest in non-torsional signals, as in actuation system pressure or force oscillations, or as linear vibrations in adjacent structures. Examples include clutch and brake "shudder" or "chatter" issues, which often involve a localized torsional vibration mode of the powertrain. Monitoring the frequency content of these non-torsional signals yields the associated torsional natural frequency. Appropriate "trigger" events include clutch or brake application, or when a vibration threshold is exceeded thereby indicating that a vibration problem such as "shudder" or "chatter" is occurring. Specific frequency bands can be monitored that bound the expected range of critical natural frequencies.

Returning again to FIG. 2, the vehicle control system may be affected by suspension vibration, as opposed to powertrain vibration. Suspension related vibration mode characteristics, such as natural frequencies and damping ratios, are learned and used to automatically optimize control parameters, including those associated with the following items: vehicle stability control systems; ride quality; variable suspension damping; variable suspension stiffness; variable suspension linkage geometry; variable, steering system damping; variable steering system stiffness; variable steering system linkage geometry; brake modulation and tire pressure. Suspension vibration modes often cause undesirable general or localized dynamics in vehicles, resulting in poor performance of associated control systems, and in noise and vibration issues. For example, in typical commercial vehicles, coincident vibration modes of the axle and brake bracketry can cause a high propensity for brake chatter. As another example, suspension "wheel hop" vibration modes can caused reduced vehicle stability and vibration issues.

If the vehicle control system is affected by suspension vibration, the method continues with the step of sensing an appropriate trigger event, as shown at conditional block 100, in a manner similar to sensing powertrain vibration, as discussed above. An appropriate trigger condition includes a "step" steering input, or an event in which a vibration threshold is crossed, such as when a tire impacts a substantial bump. Each triggering event is counted, as shown at conditional block 110, for determining the average.

Upon sensing the trigger event, relevant suspension vibration is sensed, as shown at block 120. Appropriate sensing methods include all known methods for sensing vibration. These include accelerometers, linear variable displacement transducers, string pots, and velocimeters. In a first embodiment, the relative amplitude and/or phase of the vibration between the two locations is tracked versus frequency. Typical excitation frequencies such as wheel speed (tire imbalance excitation) can be tracked specifically. The natural frequencies of the modes are then determined, at block 130, as frequencies in which the relative vibration amplitude is a maximum, and/or in which a relative vibration phase change indicates a resonance. Appropriate signal processing methods include all known methods for frequency analysis, including filtering, FFT processing, order tracking, peak picking, and zero crossing.

Alternatively, the absolute vibratory motion or force one location in the chassis/suspension/axle system during a "trigger" condition. Appropriate trigger conditions include the "step" steering input, or an event in which a vibration threshold is crossed. The amplitude and/or phase of the vibration is tracked versus frequency. Typical excitation frequencies such as wheel speed (tire imbalance excitation) can be tracked specifically. Natural frequencies of the modes are determined as frequencies in which the vibration amplitudes are at maximums, and/or in which a vibration phase change, relative to an exciting frequency such as wheel speed, indicates a resonance. The system dynamic characteristic average is then calculated, as shown at block 140, and the resultant average is stored at block 150.

Finally, the learned critical characteristic is applied to the vehicle control system, as shown at block 160. For example, if an exact critical natural frequency is "learned" according to the present invention, a notch, or stop band, filter may be applied on the actuation signature or input of a dynamic system, and the center frequency is then adjusted to the "learned" system natural frequency, to preclude the excitation of undesirable system dynamics or vibration associated with the natural frequency. Alternatively, a low pass, high pass or passband filter may also be used, in which the pertinent "pass" frequencies are adjusted to accomplish the same effect. Rather than controlling the system according to the learned system natural frequency, a time-based control parameter, such as an actuator linear or exponential ramp rate, may be adjusted as a function of the learned natural frequency or damping ratio to accomplish the same effect.

Where the critical natural frequency is a rotational vibration mode of the powertrain, the control parameter adjustment may be applied to clutch modulation force during clutch application, to brake modulation force during brake application, or to a differential lock modulation force during a differential lock or partial differential lock application.

If the critical natural frequency is related to a brake system, steering system, axle, wheel, or suspension vibration mode, the control parameter adjustment may be applied to brake modulation force, during brake application. If, however, the critical natural frequency is related to a suspension mode, such as a bounce, pitch, roll, or yaw mode, the control parameter adjustment may be applied to a suspension actuator, such as a variable damping or stiffness mechanism.

Preferred embodiments have been disclosed. However, a worker skilled in this art would recognize that modifications would come within the scope of this invention. Thus, the following claims should be studied to determine the scope and content of this invention.

What is claimed is:

1. A method for optimizing performance of any one of a plurality of vehicle control systems based on the dynamics of the specific vehicle, the method comprising:

sensing a predetermined parameter associated with one of the vehicle control systems during a predetermined trigger event, wherein sensing the predetermined parameter comprises:

sensing at least one of rotational motion and torque at at least one location in the powertrain system if the control system is affected by powertrain-related vibration; and sensing vibration at least one location in the suspension system if the control system is affected by suspension-related vibration;

determining a critical vibration mode characteristic for the one control system based on the sensed parameter; and operating the one vehicle control system based on the determined critical vibration mode characteristic.

2. The method as recited in claim 1 wherein sensing the rotational motion comprises:

determining if the vehicle control system requires optimization at a low frequency powertrain vibrations; and if so, sensing the rotational motion at a first predetermined location in the powertrain system upon sensing a predetermined event causing excitation at low frequency powertrain vibration.

3. The method as recited in claim 2 wherein determining the critical vibration mode characteristic includes determining dominant low frequency components of the sensed rotational motion.

4. The method as recited in claim 2 wherein determining the critical vibration mode characteristic includes determining a torsional stiffness of a drivetrain of the vehicle.

5. The method as recited in claim 4 wherein operating the vehicle control system includes adjusting tire pressure of the vehicle based on the determined torsional stiffness of the drivetrain.

6. The method as recited in claim 2 wherein if the vehicle control system requires optimization at frequencies other than low frequency, the method further comprising:

determining if a predetermined event causing resonant excitation of mid-high frequency powertrain vibrations has occurred; and if so, sensing at least one of relative rotational motion between a second and third predetermined location in the powertrain system and an absolute rotational motion at a fourth predetermined location in the powertrain system.

7. The method as recited in claim 6 wherein determining the critical vibration mode characteristic comprises:

comparing at least one of the relative rotational motion and the absolute rotational motion to a reference frequency; and determining a maximum amplitude of the rotational motion based on the reference frequency.

8. The method as recited in claim 7 wherein the vehicle includes a clutch and wherein the second predetermined location corresponds to a location just before the clutch and the third predetermined location corresponds to a location just after the clutch.

9. The method as recited in claim 1 wherein operating the vehicle control system includes ramping an input signal to the vehicle control system at a ramp rate based on the determined critical vibration mode characteristic.

10. A method for optimizing performance of any one of a plurality of vehicle control systems based on the dynamics of the specific vehicle, the method comprising:

sensing a predetermined parameter associated with one of the vehicle control systems during a predetermined trigger event, wherein sensing the predetermined parameter comprises:

sensing at least one of rotational motion and torque at at least one location in the powertrain system if the control system is affected by powertrain-related vibration; and sensing vibration at least one location in the suspension system if the control system is affected by suspension-related vibration, wherein sensing vibration comprises:

determining if a predetermined event causing resonant excitation of the suspension system has occurred; and if so, sensing one of relative vibration between a first and second predetermined location in the suspension system and an absolute vibration at a third predetermined location in the suspension system;

determining a critical vibration mode characteristic for the one control system based on the sensed parameter; and operating the one vehicle control system based on the determined critical vibration mode characteristic.

11. The method as recited in claim 10 wherein determining the critical vibration mode characteristic comprises:

comparing the one of the relative vibration and the absolute vibration to a reference frequency; and determining a maximum amplitude of the vibration based on the reference frequency.

12. A method for optimizing performance of any one of a plurality of vehicle control systems based on the dynamics of the specific vehicle, the method comprising:

sensing a predetermined parameter associated with one of the vehicle control systems during a predetermined trigger event;

determining a critical vibration mode characteristic for the one control system based on the sensed parameter; and operating the one vehicle control system based on the determined critical vibration mode characteristic, wherein operating the vehicle control system includes filtering an input signal to the vehicle control system at a center frequency based on the determined critical vibration mode characteristic.

13. A system for optimizing performance of any one of a plurality of vehicle control systems based on the dynamics of the specific vehicle, the system comprising:

a sensor for sensing a predetermined parameter associated with one of the vehicle control systems during a predetermined trigger event; and control logic for determining a critical vibration mode characteristic for the one control system based on the sensed parameter and operating the one vehicle control system based on the determined critical vibration mode characteristic, wherein the control logic, in determining the critical vibration mode characteristic, is further operative to determine if the vehicle control system requires optimization at a low frequency powertrain vibrations in a powertrain system and the sensor further operative to sense the rotational motion at a first predetermined location in the powertrain system upon sensing a predetermined event causing excitation at low frequency powertrain vibration if the vehicle control system requires optimization at the low frequency powertrain vibrations.

14. The system as recited in claim 13 wherein the control logic, in determining the critical vibration mode characteristic, is further operative to determine dominant low frequency components of the sensed rotational motion.

15. The system as recited in claim 13 wherein the control logic, in determining the critical vibration mode characteristic, is further operative to determine a torsional stiffness of a drivetrain of the vehicle.

16. The system as recited in claim 15 wherein the control logic, in operating the vehicle control system, is further operative to adjust tire pressure of the vehicle based on the determined torsional stiffness of the drivetrain.

17. The system as recited in claim 13, wherein the control logic, in determining the critical vibration mode characteristic, is further operative to determine the low and mid range torsional material frequencies, and in operating the vehicle control system, is further operative to adjust clutch modulator based on the low and mid range torsional material frequencies.

18. The system as recited in claim 13, wherein the control logic, in determining the critical vibration mode characteristic, is further operative to determine the powertrain torsional and suspension natural frequencies, and in operating the vehicle control system, is further operative to adjust brake modulation based on the powertrain torsional and suspension natural frequencies.

19. The system as recited in claim 13, wherein the control logic, in determining the critical vibration mode characteristic, is further operative to determine the suspension natural frequencies, and in operating the vehicle control system, is further operative to adjust suspension actuation modulation based on the suspension natural frequencies.

20. The system as recited in claim 13, wherein the control logic, in determining the critical vibration mode characteristic, is further operative to determine the powertrain torsional natural frequencies, and in operating the vehicle control system, is further operative to adjust engine torque modulation based on the powertrain torsional natural frequencies.

21. The system as recited in claim 13 wherein if the vehicle control system requires optimization at frequencies other than low frequency, the control logic is further operative to determine if a predetermined event causing resonant excitation of mid-high frequency powertrain vibrations has occurred, and wherein the sensor is further operative to sense one of relative rotational motion between a second and third predetermined location in the powertrain system and an absolute rotational motion at a fourth predetermined location in the powertrain system.

22. The system as recited in claim 21 wherein the control logic, in determining the critical vibration mode characteristic, is further operative to compare the one of the relative rotational motion and the absolute rotational motion to a reference frequency and determine a maximum amplitude of the rotational motion based on the reference frequency.

23. The system as recited in claim 22 wherein the vehicle includes a clutch and wherein the second predetermined location corresponds to a location just before the clutch and the third predetermined location corresponds to a location just after the clutch.

24. A system for optimizing performance of any one of a plurality of vehicle control systems based on the dynamics of the specific vehicle, the system comprising:
 a sensor for sensing a predetermined parameter associated with one of the vehicle control systems during a predetermined trigger event; and
 control logic for determining a critical vibration mode characteristic for the one control system based on the sensed parameter and operating the one vehicle control system based on the determined critical vibration mode characteristic, wherein the control logic, in determining the critical vibration mode characteristic, is further operative to determine if a predetermined event causing resonant excitation of a suspension system has occurred and wherein the sensor is further operative to sense one of relative vibration between a first and second predetermined location in the suspension system and an absolute vibration at a third predetermined location in the suspension system.

25. The system as recited in claim 24 wherein the control logic, in determining the critical vibration mode characteristic, is further operative to compare the one of the relative vibration and the absolute vibration to a reference frequency and determine a maximum amplitude of the vibration based on the reference frequency.

26. A system for optimizing performance of any one of a plurality of vehicle control systems based on the dynamics of the specific vehicle, the system comprising:
 a sensor for sensing a predetermined parameter associated with one of the vehicle control systems during a predetermined trigger event; and
 control logic for determining a critical vibration mode characteristic for the one control system based on the sensed parameter and operating the one vehicle control system based on the determined critical vibration mode characteristic, wherein the control logic, in operating the vehicle control system, is further operative to filter an input signal to the vehicle control system at a center frequency based on the determined critical vibration mode characteristic.

27. A system for optimizing performance of any one of a plurality of vehicle control systems based on the dynamics of the specific vehicle, the system comprising:
 a sensor for sensing a predetermined parameter associated with one of the vehicle control systems during a predetermined trigger event; and
 control logic for determining a critical vibration mode characteristic for the one control system based on the sensed parameter and operating the one vehicle control system based on the determined critical vibration mode characteristic, wherein the control logic, in operating the vehicle control system, is further operative to ramp an input signal to the vehicle control system at a ramp rate based on the determined critical vibration mode characteristic.

* * * * *